(12) United States Patent
Matsuzaki

(10) Patent No.: US 6,354,854 B1
(45) Date of Patent: Mar. 12, 2002

(54) VEHICLE-MOUNTED ROTARY CONNECTOR

(75) Inventor: Nobuo Matsuzaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/602,047

(22) Filed: Jun. 23, 2000

(30) Foreign Application Priority Data

Jun. 23, 1999 (JP) ............................................ 11-177015

(51) Int. Cl.[7] .................................................. H01R 3/00
(52) U.S. Cl. ...................................................... 439/164
(58) Field of Search ........................... 439/164, 15, 154

(56) References Cited

U.S. PATENT DOCUMENTS

| | | |
|---|---|---|
| 3,763,455 A | 10/1973 | Confer et al. |
| 5,865,634 A | 2/1999 | Best |
| 5,882,216 A | 3/1999 | Matsumoto et al. |
| 5,944,544 A | 8/1999 | Kuroda et al. |
| 5,980,286 A | 11/1999 | Best et al. |

Primary Examiner—Brian Sircus
Assistant Examiner—J. F. Duverne
(74) Attorney, Agent, or Firm—Brinks Hofer Gilson & Lione

(57) ABSTRACT

A vehicle-mounted rotary connector includes rotatably coupled fixed and movable housings, first and second flexible cables accommodated in such a manner that they can be wound up and unwound in a ring-shaped cable-accommodating space formed between the housings, and a moving member for reversing the winding direction of the flexible cables. Openings formed in the moving member for passing the flexible cables therethrough are different in width, and the reversed section of the first flexible cable having carried therein the conductors for the air bag circuit is carried by the opening having a large width. The first flexible cable having carried therein the conductors for the air bag circuit does not abut against either of a first specific roller and a first fixed cylinder provided on the moving member during the rotation of the movable housing. Therefore, stress exerted on the conductors for the air bag circuit can be relieved, whereby disconnection and incomplete connection of the air bag circuit can be prevented.

4 Claims, 4 Drawing Sheets

VEHICLE-MOUNTED ROTARY CONNECTOR

BACKGROUND OF THE INVENTION

1. Field of the Invention

The present invention relates to a vehicle-mounted rotary connector mounted to a steering system of a motor vehicle to be used as an electrical connection means for an air bag system or the like. More particularly, the invention relates to a vehicle-mounted rotary connector in which plural flexible cables are accommodated in a cable-accommodating space and the winding direction of the flexible cables is reversed in the cable accommodating space.

2. Description of the Related Art

A vehicle-mounted rotary connector is incorporated in a steering system of a motor vehicle to be used as an electrical connection means for an air bag circuit, a horn circuit, and other switch circuits fitting in a steering wheel, and is basically composed of a pair of a fixed housing and a movable housing which are coaxially disposed and are rotatably connected to each other, and a flexible cable accommodated in such a manner that it can be wound up and unwound in a ring-shaped cable-accommodating space formed between the pair of housings. The flexible cable carries plural electrically independent conductors between two insulating base films and is formed in a belt-like shape.

Along with the recent increasing trends toward fitting circuits in steering wheels, an increase in the number of conductors carried by the flexible cable, that is, an increase in the number of circuits, and a reduction in the external dimensions are demanded.

Hitherto, this type of rotary connector has been proposed, as disclosed in, for example, U.S. Pat. No. 5,865,634 in which plural flexible cables are accommodated in a cable-accommodating space, and the winding direction of the flexible cables is reversed halfway. The accommodation of the plural flexible cables in the cable-accommodating space can respond to the demand for increasing the number of circuits because the number of conductors capable of being carried by the flexible cables can be increased as compared to the accommodation of only one flexible cable. In addition, the halfway reversal of the winding direction of the flexible cables can shorten the necessary length of the flexible cable to about one-half as compared to a case in which the flexible cables are not reversed halfway. Therefore, the number of windings of the flexible cables can be decreased, and the external dimension of the rotary connector can be reduced.

A rotating member (called a moving member) is accommodated in the cable-accommodating space, and the flexible cable is wound in a U-shape around a roller fitted on the moving member, whereby the winding direction of the flexible cable is reversed.

FIG. 5 shows a construction of the rotary connector disclosed in U.S. Pat. No. 5,865,634. Referring to FIG. 5, there are provided a fixed housing 101, a movable housing 102, a ring-shaped cable-accommodating space formed between the pair of housings 101 and 102, a moving member 104 rotatably accommodated in the space-accommodating space 103, first and second rollers 105 and 106 rotatably fitted on the moving member 104, first and second openings 107 and 108 formed in the moving member 104 for passing flexible cables therethrough, first and second flexible cables 109 and 110, and connectors 111 and 112 connected to both ends of the flexible cables. In this specification, in order to facilitate comparison of the present invention with the above conventional example, components in the conventional example are renamed to correspond to the components shown in FIG. 5.

The flexible cables 109 and 110 are double-wound with the first flexible cable 109 wound on the inner peripheral side and the second flexible cable 110 wound on the outer peripheral side, and are accommodated in the cable-accommodating space 103. The connectors 111 and 112 connected to both ends of the flexible cables 109 and 110 are fixed to the fixed housing 101 and the movable housing 102, respectively, and are connected to external circuits, such as an air bag circuit and the like. The first flexible cable 109 passes through the first opening 107 during its winding to be wound around the first roller 105 in a U-shape, whereby the winding direction is reversed 180 degrees. On the other hand, the second flexible cable 110 passes through the second opening 108 during its winding to be wound around the second roller 106 in a U-shape, whereby the winding direction is reversed 180 degrees.

In the rotary connector, when the movable housing 102 is rotated counterclockwise in relation to the fixed housing 101, the flexible cables 109 and 110 are wound up around the movable housing 102, reversed sections 109a and 110a come into close contact with the peripheral surfaces of the first and second rollers 105 and 106, so that the first and second rollers 105 and 106 are rotated clockwise and counterclockwise, respectively, by tensile forces of the flexible cables 109 and 110, and the moving member 104 is rotated counterclockwise. Conversely, when the movable housing 102 is rotated clockwise in relation to the fixed housing 101, the flexible cables 109 and 110 are unwound from the movable housing 102, and the reversed sections 109a and 110a come into close contact with side face portions of the first and second openings 107 and 108, so that the moving member 104 is rotated counterclockwise by pressing forces of the flexible cables 109 and 110. This can maintain the continuity between the flexible cables 109 and 110 during the rotation of the movable housing 102.

The rotary connector constructed as described above, however, does not take this into consideration at all because of double winding of the flexible cables 109 and 110, the difference between the winding amount of the flexible cables 109 and 110 around the movable housing 102 and the unwinding amount of the flexible cables 109 and 110 from the movable housing 102 is generated when the movable housing 102 is rotated, and includes the following inconveniences.

That is, when the movable housing 102 is rotated counterclockwise to gradually wind up the double-wound flexible cables 109 and 110 around the movable housing 102, since the winding speed of the second flexible cable 110 disposed and wound on the outer peripheral side is faster than that of the first flexible cable 110 disposed and wound on the inner peripheral side, and the first and second openings 107 and 108 of the conventional rotary connector are formed to have the same widths w1 and w2, the first flexible cable 109 does not abut against the first roller 105 even if the second flexible cable 110 abuts against the second roller 106 in accordance with the rotation of the movable housing 102. In addition, since the moving speed of the reversed section 110a in the circumferential direction is faster than the moving speed of the reversed section 109a in the circumferential direction, the reversed section 109a is brought into abutment with a wall opposing the roller 105. In this state, the moving member 104 and the reversed section 109a push strongly against each other, whereby the rotation of the moving member 104 and the movable housing 102 is prevented.

This also applies to a case where the movable housing 102 is rotated clockwise to unwind the double-wound flexible cables 109 and 110 from the movable housing 102. That is, since the unwinding speed of the second movable cable 110 disposed and wound on the outer peripheral side is faster than that of the first flexible cable 109 disposed and wound on the inner peripheral side, and the first and second openings 107 and 108 of the conventional rotary connector are formed to have the same widths w1 and w2, the second flexible cable 110 abuts against the side face portion of the second opening 108 prior to the first flexible cable 109 in accordance with the rotation of the movable housing 102. In addition, since the moving speed of the reversed section 110a in the circumferential direction is faster than the moving speed of the reversed section 109a in the circumferential direction, the reversed section 109a is brought strongly into abutment with the roller 105, whereby the rotation of the movable housing 102 is also prevented.

In order to avoid the above inconveniences, a rotary connector was previously proposed (in an application to the same assignee) in which the width w1 of the first opening 107 through which the reversed section 109a of the first flexible cable 109 passed was set to be narrower than the width w2 of the second opening 108 through which the reversed section 110a of the second flexible cable 110 passed. The width w1 of the first opening 107 and the width w2 of the second opening 108 are set in consideration of the difference in the winding speed and the unwinding speed between the first and second flexible cables 109 and 110.

In the thus-constructed rotary connector, since the width w1 of the first opening 107 is set to be narrower than the second opening 108 as described above, the moving member 104 is driven by the reversed section 109a of the first flexible cable 109 passing through the narrow opening 107. In this case, since the reversed section 110a is disposed within the wide second opening 108, even if the moving speed of the reversed section 110a in the circumferential direction is faster than the moving speed of the reversed section 109a in the circumferential direction, the difference between the moving speed is absorbed by the wide opening 108. That is, the reversed section 110a is designed so as not to abut against the roller 105. Therefore, although the reversed section 109a in the narrow opening 107 drives the moving member 104 in the circumferential direction, the reversed section 110a can be moved in the wide opening 108 so as not to abut against the roller 105, whereby the moving member 104 and the movable housing 102 can be smoothly rotated.

As described above, the vehicle-mounted rotary connector is incorporated in the steering system of the motor vehicle to be used as an electrical connection means for the air bag circuit, the horn circuit, and the like. Among these circuits, high reliability is particularly required for the air bag circuit from the viewpoint of safety. Therefore, in order to prevent occurrence of disconnection or incomplete connection, it is necessary that stress due to the rotation of the steering wheel, that is, the movable housing, not be exerted on the flexible cable having carried therein the conductors connected to the air bag circuit.

In the rotary connector disclosed in U.S. Pat. No. 5,865,634, however, both of the flexible cables 109 and 110 abut against the rotors 105 and 106 or the side faces of the openings 107 and 108 with the rotation of the movable housing 102. Therefore, stress due to the rotation of the movable housing is exerted on the flexible cable having carried therein the conductors connected to the air bag circuit. In addition, in the rotary connector of the present application (to the same assignee), stress due to the rotation of the movable housing is exerted on one flexible cable for driving the moving member 104. This is undesirable when the conductors for the air bag circuit are carried in the above single flexible cable.

SUMMARY OF THE INVENTION

The present invention has been made in order to overcome the problems of the conventional art, and an object thereof is to provide a vehicle-mounted rotary connector which prevents occurrence of disconnection or incomplete connection in conductors for an air bag circuit, and which has superior reliability and durability.

According to the present invention, there is provided a vehicle-mounted rotary connector including: a pair of housings rotatably coupled to each other; plural flexible cables accommodated in such a manner that the flexible cables can be wound up and unwound in a ring-shaped cable-accommodating space formed between the pair of housings, and fixed to the pair of housings at both ends thereof; and a moving member rotatably accommodated in the ring-shaped cable-accommodating space to reverse the winding direction of the flexible cables; wherein the moving member is formed with plural openings through which reversed sections of the flexible cables pass, and a width of at least one opening in the circumferential direction is set to be larger than the width of other openings, and wherein, among the plural flexible cables, a conductor connected to a vehicle-mounted air bag circuit is carried in a flexible cable passing through the opening of a larger width.

It is possible to set the widths of the openings formed in the moving member to arbitrary values according to demand in designing the rotary connector. As described in the Description of the Related Art, the plural openings for passing the reversed sections of the flexible cables therethrough are different in size, whereby the degree of abutment of the flexible cables against the rollers provided on the moving member or the side face portions of the openings can be adjusted. Therefore, by adjusting the widths of the openings, only a part of the plural flexible cables can be brought into abutment with the rollers provided on the moving member or the side face portions of the openings, and other flexible cables can be prevented from being brought into abutment with the rollers or the side face portions of the opening regardless of the amount of rotation of the movable housing from the neutral position. If the conductor for the air bag circuit is carried in the flexible cables, which pass through the opening having a large width and do not abut against the rollers provided on the moving member or the side face portions of the openings due to the rotation of the movable housing, stress due to the rotation of the movable housing is not exerted on the conductor for the air bag circuit, and disconnection or incomplete connection of the air bag circuit can be prevented. Therefore, reliability and durability of the air bag circuit can be improved.

In the vehicle-mounted rotary connector, although three or more flexible cables can be accommodated in the cable-accommodating space, two flexible cables are sufficient at present from the viewpoint of the number of vehicle-mounted circuits. If the number of flexible cables to be accommodated in the cable-accommodating space is limited to two in this way, the positions of the reversed sections can be sufficiently separated. Therefore, interference between the flexible cables can be prevented, whereby the movable housing can be smoothly rotated.

Although the reversed sections can be set at any positions in the cable-accommodating space according to demand, the positions of the reversed section may preferably be separated in order to prevent interference between the flexible cables. From this point of view, it is particularly preferable that the reversed sections of the plural flexible cables be separately disposed at about 360/n degrees, where n represents the number of flexible cables to be accommodated in the cable-accommodating space, along the circumferential direction of the cable-accommodating space.

Furthermore, although the relationship between the alignment of the lap-mounted plural flexible cables and the openings through which the reversed sections of the flexible cables passes is not restricted at all, in order to facilitate the design of the moving member and the rotary connector by reducing the width as small as possible, it is particularly preferable that the flexible cable on the outer peripheral side, which is wound up around and unwound from the movable housing at a high speed, and which is easy to abut against the rollers provided on the moving member or the side face portions of the openings, be passed through the narrow opening, and the flexible cable on the inner peripheral side, which is wound up around and unwound from the movable housing at a low speed, and which is difficult to abut against the rollers provided on the moving member or the side face portions of the openings, be passed through the wide opening.

Further objects, features, and advantages of the present invention will become apparent from the following description of the preferred embodiment with reference to the attached drawings.

DESCRIPTION OF THE PREFERRED EMBODIMENT

An embodiment of a vehicle-mounted rotary connector according to the present invention will now be described with reference to FIGS. 1 to 4.

Figure 1:
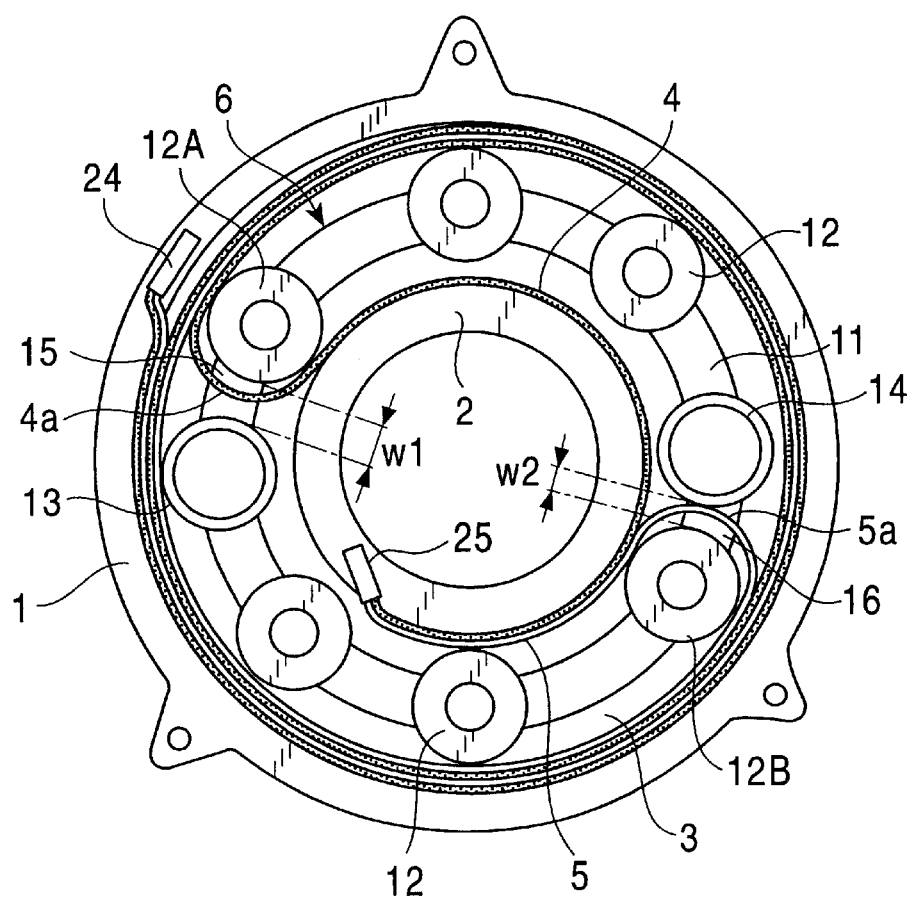
FIG. 1 is a plan view showing the internal structure of a vehicle-mounted rotary connector according to an embodiment of the present invention.
Figure 2:
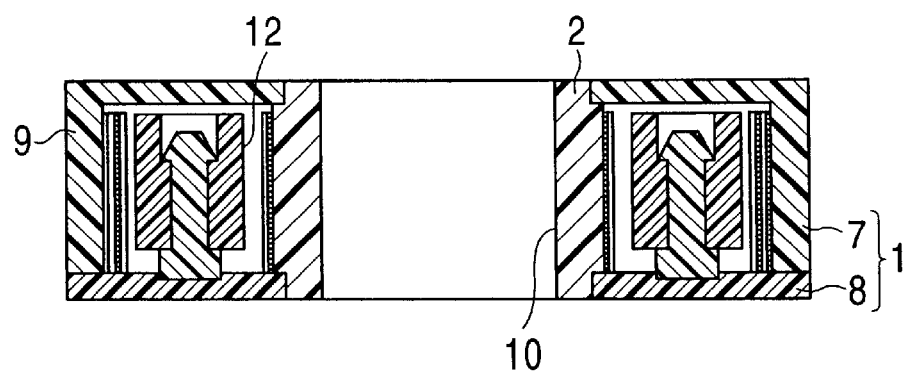
FIG. 2 is a sectional view of the rotary connector.
Figure 3:
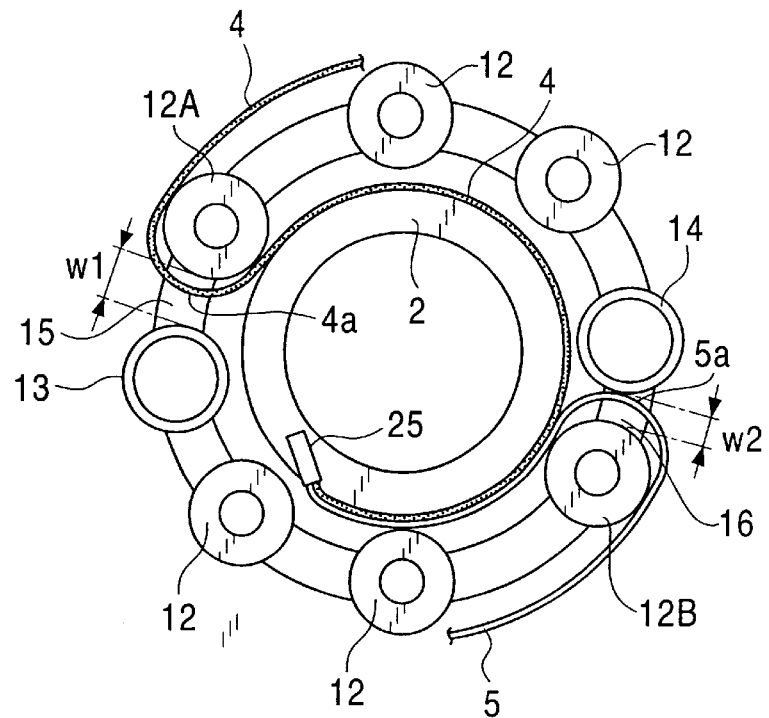
FIG. 3 is an explanatory view of a principal part of the rotary connector.

As shown in FIGS. 1 to 3, the vehicle-mounted rotary connector of this embodiment is mainly composed of a fixed housing 1, a movable housing 2 coaxially and rotatably coupled to the fixed housing 1, first and second flexible cables 4 and 5 accommodated in a ring-shaped cable-accommodating space 3 that is formed between the housings 1 and 2, and a moving member 6 rotatably accommodated in the cable-accommodating space 3.

The fixed housing 1 is composed of an upper casing 7 and a lower casing 8 integrated with each other, and the upper casing 7 is formed with an outer cylindrical section 9. On the other hand, the movable housing 2 is formed with an inner cylindrical section 10. The fixed housing 1 and the movable housing 2 are coaxially combined and rotatably coupled to each other, whereby the ring-shaped cable-accommodating space 3 is formed between the outer cylindrical section 9 and the inner cylindrical section 10.

The moving member 6 is composed of a ring-shaped rotary plate 11, plural rollers 12 rotatably supported on the ring-shaped rotary plate 11, specific rollers 12A and 12B among the plural rollers 12 around which the flexible cables 4 and 5 are wound in a U-shape, and fixed cylinders 13 and 14 disposed to oppose each other in the circumferential direction of the rotary plate 11. A first opening 15 is formed between the specific roller 12A and the fixed cylinder 13, and a second opening 16 is formed between the specific roller 12B and the fixed cylinder 14. The first opening 15 is located at a 180-degree-opposite position in relation to the second openings 16 via the center of the rotary plate 11.

As shown in FIG. 3 in detail, the first and second openings 15 and 16 differ in width in the circumferential direction of the rotary plate 11. In FIG. 3, the width w1 of the first opening 15 through which the double-wound first flexible cable 4 disposed on the inner peripheral side passes is set to be wider than the width w2 of the second opening 16 through which the double-wound second flexible cable 5 disposed on the outer peripheral side passes.

In consideration of the difference in the winding speed and unwinding speed between the flexible cables 4 and 5 around and from the inner cylindrical section 10 when rotating the movable housing 2 in relation to the fixed housing 1, the widths w1 and w2 of the first and second openings 15 and 16 are adjusted so that a reversed section 4a of the first flexible cable 4 does not abut against either of the first specific roller 12A and the first fixed cylinder 13 even if a reversed section 5a of the second flexible cable 5 abuts against the second specific roller 12B or the second fixed cylinder 14.

Figure 4A:
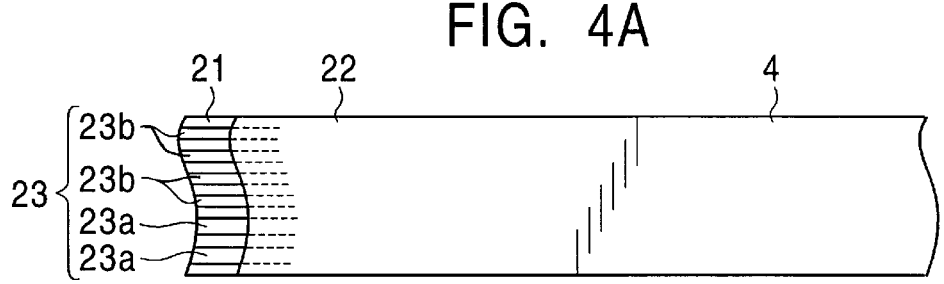
FIGS. 4A and 4B are partial explanatory views of two flexible cables wound and accommodated in the rotary connector.
Figure 4B:
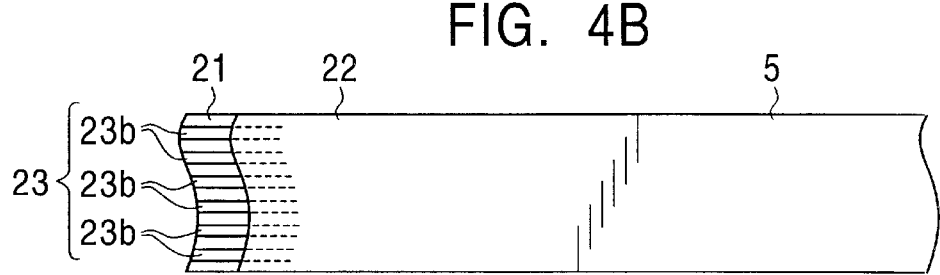
Figure 5:
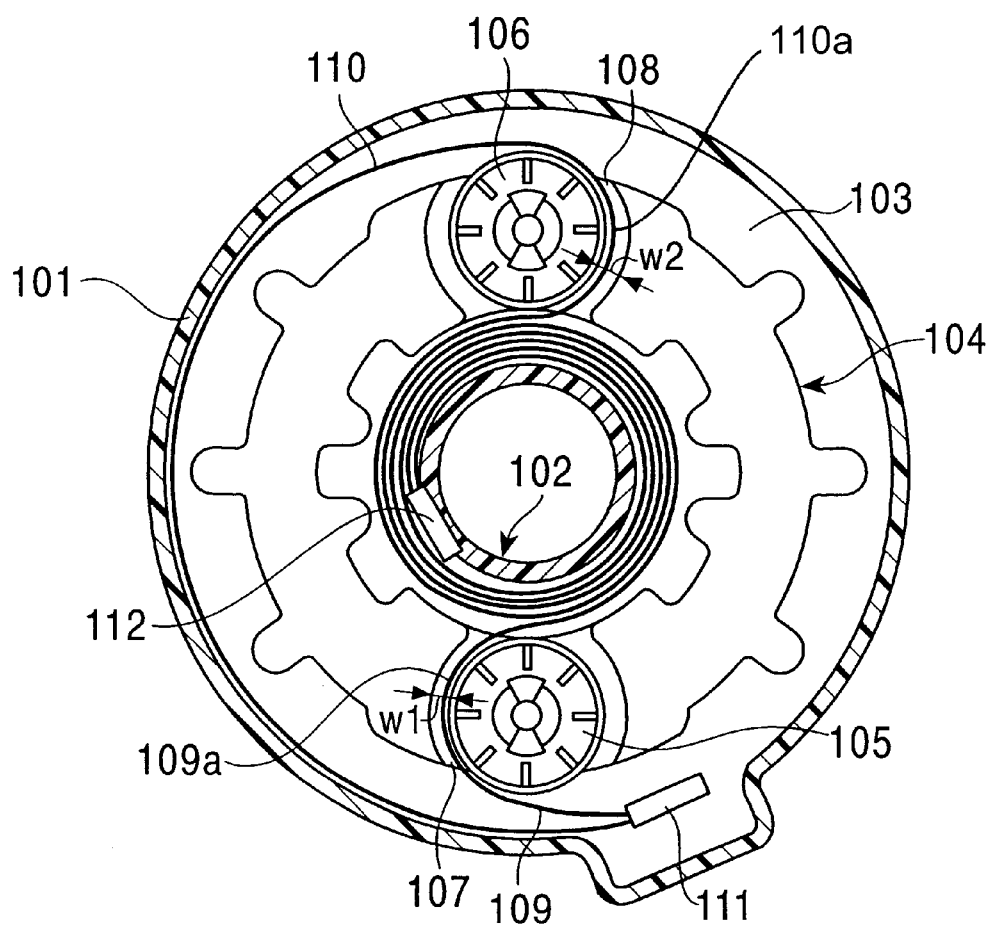
FIG. 5 is a plan view showing the internal structure of a conventional vehicle-mounted rotary connector.
Figure 6:
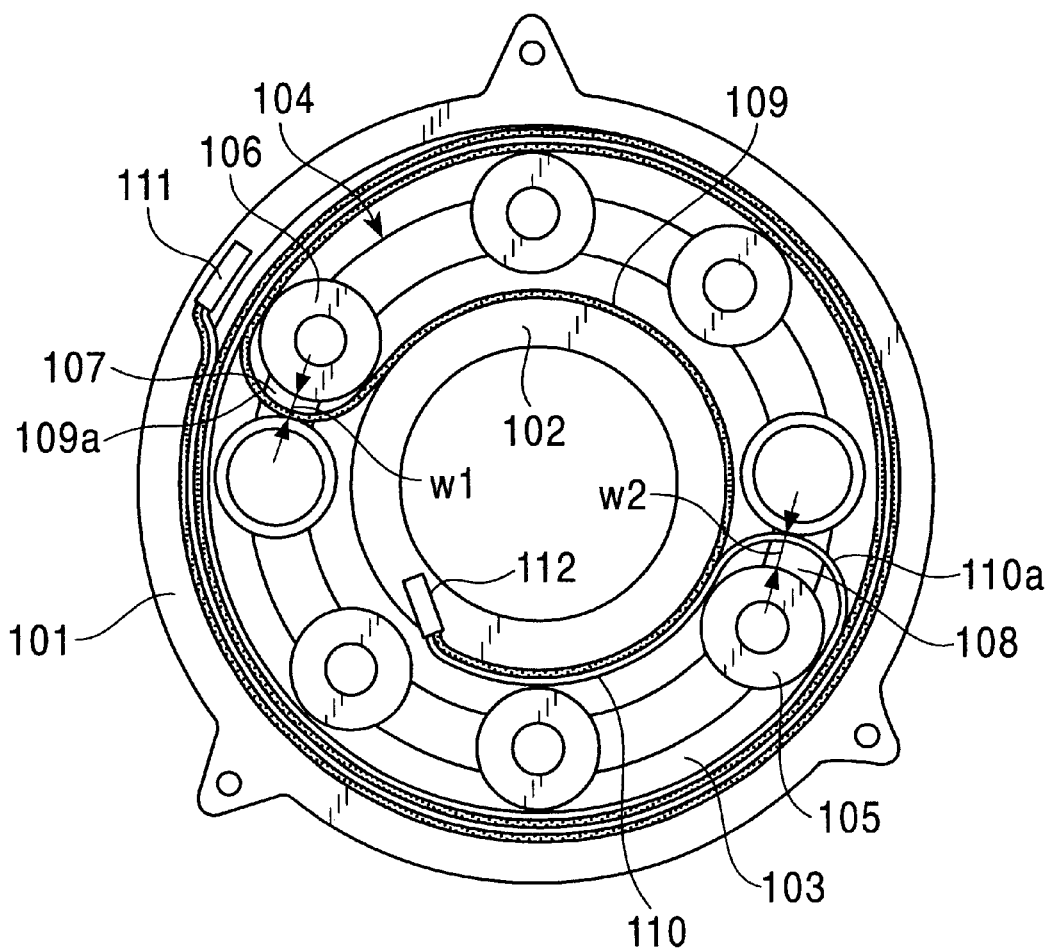
FIG. 6 is a plan view showing the internal structure of another conventional vehicle-mounted rotary connector.

Each of the first and second flexible cables 4 and 5 has plural conductors 23 made of copper or the like laminated between base films 21 and 22 formed of an insulating material, and is formed in a belt-like shape having a predetermined length, as shown in FIGS. 4A and 4B. As shown in FIG. 4A, the first flexible cable 4 carries two conductors 23a for an air bag circuit, each having a wide width, and four conductors 23b for a horn circuit and a switch circuit, each having a width narrower than the width of each conductor 23a. The second flexible cable 5 carries six conductors 23b for the horn circuit and the switch circuit, each having a narrow width, as shown in FIG. 4B. These conductors 23a and 23b are led out via connectors 24 and 25 that are connected to ends of the first and second flexible cables 4 and 5 and are fitted at predetermined positions in the fixed housing 1 and the movable housing 2, and are connected to the air bag circuit and the horn circuit via external connectors (not shown) coupled to the connectors 24 and 25.

As shown in FIGS. 1 and 3, the first flexible cable 4 passes through the first opening 15 to be wound around the first specific roller 12A in a U-shape, the inner peripheral side of a reversed section 4a is directly wound around the inner cylindrical section 10 of the movable housing 2, and the outer peripheral side of the reversed section 4a is lap-wound on the second flexible cable 5 that is wound by one turn around the outer cylindrical section 9 of the fixed housing 1. On the other hand, the second flexible cable 5 passes through the second opening 16 to be wound around the second specific roller 12B in a U-shape, the inner peripheral side of a reversed section 5a is lap-wound on the first flexible cable 4 that is wound by one turn around the inner cylindrical section 10 of the movable housing 2, and the outer peripheral side of the reversed section 5a is directly wound around the outer cylindrical section 9 of the fixed housing 1.

The thus-constructed rotary connector is mounted on a motor vehicle by securing the fixed housing 1 to a stator member of a steering system, fixing the movable housing 2 to a steering wheel serving as a rotating member of the steering system, and connecting the external connectors (not shown) provided on the air bag circuit and the horn circuit and the like to the connectors 24 and 25 fitted in the housings 1 and 2. In mounting the rotary connector to the steering system, a neutral position of the movable housing 2 with respect to the fixed housing 1 is brought strictly into coincidence with a neutral position of the steering system, and an adjustment is made so that a tensile force greater than a predetermined value is not exerted on the first and second flexible cables 4 and 5 within a movable range of the steering range.

The operation of the vehicle-mounted rotary connector of the above embodiment will now be described.

When the steering wheel is rotated clockwise from a neutral position, the rotational force is transmitted to the movable housing 2 causing the movable housing 2 to rotate clockwise, and the first and second flexible cables 4 and 5 are wound up around the inner cylindrical section 10 of the movable housing 2. In this case, the reversed section 5a of the second flexible cable 5, which is wound around the inner cylindrical section 10 at a high speed since it is wound on the outer peripheral side, and which passes through the narrow second opening 16, abuts against the second specific roller 12B, and the moving member 6 receives the rotational force of the movable housing 2 to rotate clockwise by about half the amount of rotation of the movable housing 2. On the other hand, since the first flexible cable 4 disposed on the inner peripheral side and double-wound with the second flexible cable 5 is wound up around the inner cylindrical section 10 at a speed lower than that of the second flexible cable 5, and passes through the wide first opening 15, the reversed section 4a does not abut against either of the first specific roller 12A and the first fixed cylinder 13. In addition, since an external force, such as a frictional force, is not exerted on the reversed section 4a, it is possible to prevent damage to the conductors 23a for the air bag circuit that are particularly important from the viewpoint of safety.

In contrast, when the steering wheel is rotated counterclockwise from the neutral position, the rotational force is transmitted to the movable housing 2 causing the movable housing 2 to rotate counterclockwise, and the first and second flexible cables 4 and 5 are unwound from the inner cylindrical section 10 of the movable housing 2. In this case, the reversed section 5a of the second flexible cable 5, which is unwound from the inner cylindrical section 10 at a high speed since it is wound on the outer peripheral side, and which passes through the narrow second opening 16, abuts against the second fixed cylinder 14, and the moving member 6 receives the rotational force of the movable housing 2 to rotate counterclockwise by about half the amount of rotation of the movable housing 2. On the other hand, since the first flexible cable 4 disposed on the inner peripheral side and double-wound with the second flexible cable 5 is unwound from the inner cylindrical section 10 at a speed lower than that of the second flexible cable 5, and passes through the wide first opening 15, the reversed section 4a does not abut against either of the first specific roller 12A and the first fixed cylinder 13. In addition, since an external force, such as a frictional force, is not exerted on the reversed section 4a, it is possible to prevent damage to the conductors 23a for the air bag circuit, which are particularly important from the viewpoint of safety.

In the vehicle-mounted rotary connector according to the present invention, the openings 15 and 16 formed in the moving member 6 for passing the flexible cables 4 and 5 therethrough differ in width, and the reversed section 4a of the flexible cable 4 having carried therein the conductors 23a for the air bag circuit is carried by the wide opening 15. Therefore, the flexible cable 4 does not abut against either of the first specific roller 12A and the first fixed cylinder 13 provided on the moving member 6 during the rotation of the movable housing 2, and stress due to the rotation of the movable housing 2 is not exerted on the conductors 23a for the air bag circuit. This can prevent disconnection or incomplete connection of the air bag circuit, whereby reliability and durability of the air bag circuit can be improved.

In addition, since the number of flexible cables to be accommodated in the cable-accommodating space 3 is limited to two, the reversed sections 4a and 5a can be sufficiently separated, and interference between the flexible cables 4 and 5 can be prevented, whereby the movable housing 2 can be smoothly rotated in relation to the fixed housing 1.

Furthermore, the reversed sections 4a and 5a are separately disposed at about 360/n degrees (where n represents the number of flexible cables to be accommodated in the cable-accommodating space 3) along the circumferential direction of the cable-accommodating space 3. Therefore, interference between the flexible cables 4 and 5 can be prevented, whereby the movable housing 2 can be smoothly rotated in relation to the fixed housing 1.

Furthermore, the flexible cable 5 on the outer peripheral side, which is wound up around and unwound from the movable housing 2 at a high speed, and which is easy to abut against the second specific roller 12B provided on the moving member 6 or the second fixed cylinder 14 disposed to oppose the second specific roller 12B, is passed through the narrow opening 16, and the flexible cable 4 on the inner peripheral side, which is wound up around and unwound from the movable housing 2 at a low speed, and which is difficult to abut against the first specific roller 12A provided on the moving member 6 or the first fixed cylinder 3 disposed to oppose the first specific roller 12A, is passed through the wide opening 15. Therefore, the widths of the openings 15 and 16 can be reduced overall, whereby the design of the moving member 6 and the rotary connector can be facilitated.

While the two flexible cables 4 and 5 are accommodated in the cable-accommodating space 3 in the above embodiment, the number of the flexible cables is not limited at all, and three or more, and any number of the flexible cables may be multiple-wound and accommodated in the cable-accommodating space 3.

While the number of the conductors 23 to be carried in the single flexible cable is six in the above embodiment, the number of the conductors 23 is also not limited at all, and any number of conductors (six or less, or six or more) may be carried in the single flexible cable.

While the conductors 23a for the air bag circuit are formed to have a width larger than the width of the conductors 23b for other circuits in the above embodiment, these conductors 23a and 23b may be formed to have the same width unless the continuity of the air bag circuit is interfered with.

In the above embodiment, the conductors 23a for the air bag circuit are carried in the first flexible cable 4, and the width w1 of the first opening 15 through which the reversed section 4a of the first flexible cable 4a passes is set to be wider than the width w2 of the second opening 16 through which the reversed section 5a of the second flexible cable 5 passes. Conversely, however, it is possible that the conductors 23a for the air bag circuit be carried in the second flexible cable 5, and the width w2 of the second opening 16 through which the reversed section 5a of the second flexible cable 5 passes be set to be wider than the width w1 of the first opening 15 through which the reversed section 4a of the first flexible cable 4 passes.

What is claimed is:

1. A vehicle-mounted rotary connector, comprising:

a pair of housings rotatably coupled to each other;

plural flexible cables accommodated such that the flexible cables can be wound up and unwound in a ring-shaped cable-accommodating space formed between the pair of housings, the flexible cables fixed to the pair of housings at both ends thereof; and a moving member rotatably accommodated in the ring-shaped cable-accommodating space to reverse a winding direction of the flexible cables;

wherein the moving member is formed with plural openings through which reversed sections of the flexible cables pass, and a width of at least one opening in a circumferential direction is larger than a width of other openings, and wherein, among the plural flexible cables, a conductor connected to a vehicle-mounted air bag circuit is carried only in a flexible cable passing through the opening of a larger width.

2. A vehicle-mounted rotary connector according to claim 1, wherein two flexible cables are accommodated in the cable-accommodating space as the plural flexible cables.

3. A vehicle-mounted rotary connector according to claim 1, wherein reversed sections of the plural flexible cables are separately disposed at about 360/n degrees, where n represents the number of flexible cables to be accommodated in the cable-accommodating space, along the circumferential direction of the cable-accommodating space.

4. A vehicle-mounted rotary connector according to claim 1, wherein the plural flexible cables are lap-wound with the flexible cable passing through the opening of a small width, wound outside, and flexible cables, except the flexible cable passing through the opening of a small width, wound inside.

* * * * *